Sept. 5, 1950      H. BERNARD      2,521,564
REVERSIBLE POINTER AND SCALE INDICATOR
Filed Oct. 24, 1946      2 Sheets-Sheet 1
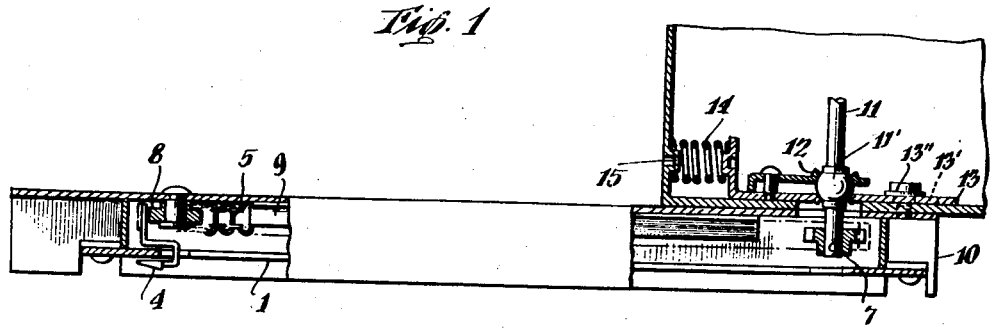
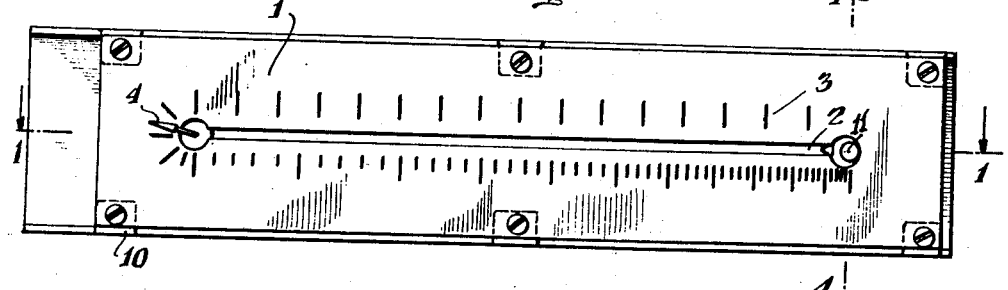
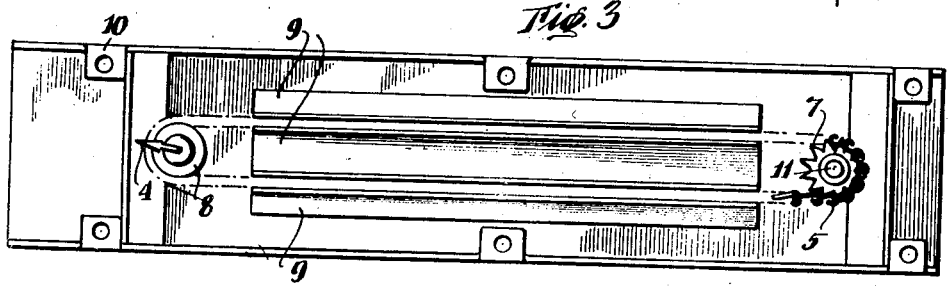
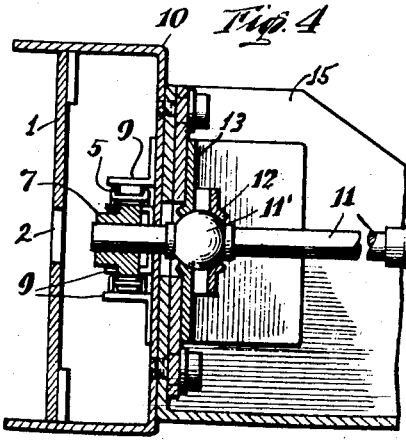
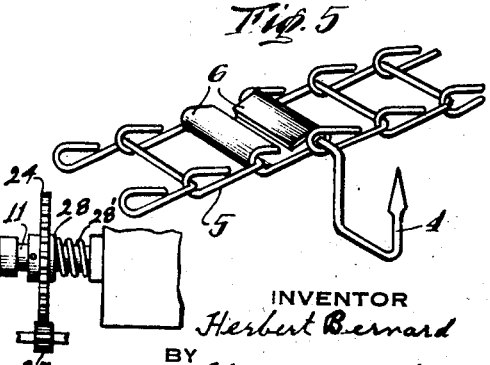
INVENTOR
Herbert Bernard
BY
Charles W. Mortimer
ATTORNEY Sept. 5, 1950         H. BERNARD         2,521,564
REVERSIBLE POINTER AND SCALE INDICATOR
Filed Oct. 24, 1946         2 Sheets-Sheet 2
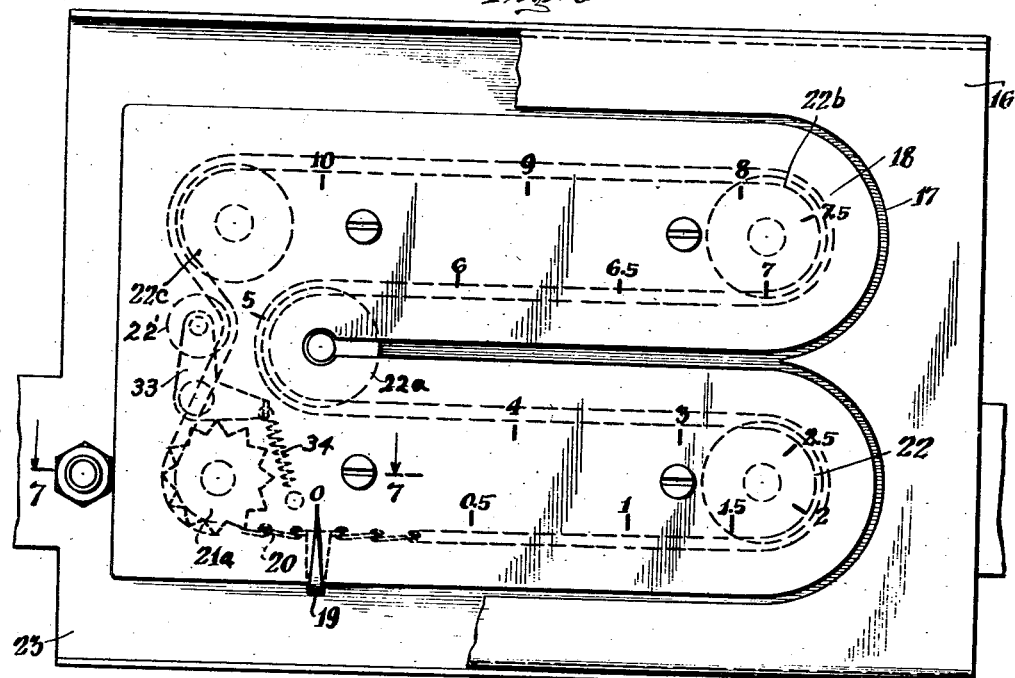
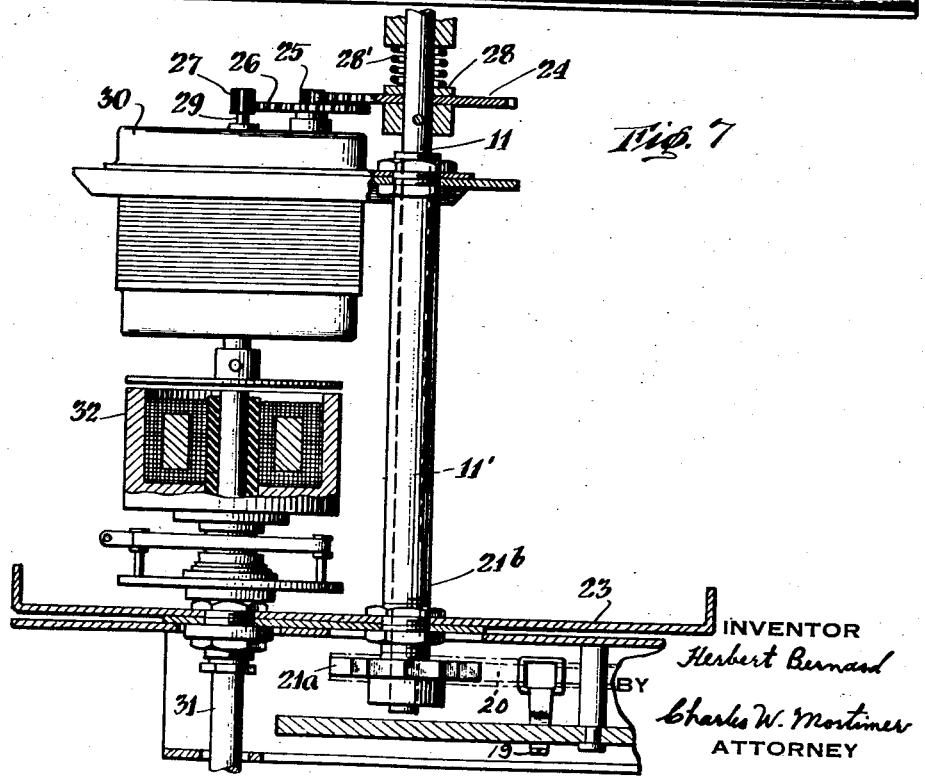
INVENTOR
Herbert Bernard
BY
Charles W. Mortimer
ATTORNEY Patented Sept. 5, 1950

2,521,564

UNITED STATES PATENT OFFICE 2,521,564

REVERSIBLE POINTER AND SCALE INDICATOR

Herbert Bernard, Belleville, N. J., assignor to Allen B. Du Mont Laboratories, Inc., Passaic, N. J., a corporation of Delaware Application October 24, 1946, Serial No. 705,445

3 Claims. (Cl. 177—327)

This invention relates to an indicating device in which a pointer is caused to move along a scale.

One of the objects of this invention is to provide means for indicating accurately by the slide rule method, the positions to which a variable element is set, and in doing so to use the minimum of dial space.

Another object of this invention is to use both sides of a single slot in a slide rule indicator and to make the pointed traverse the slot first on one side and then turn about on itself 180° and traverse the opposite side of said slot. In this way, linear travel equal to twice the length of the slot is attained.

Another object is to enable the indication to be spread in any desired pattern, such as several parallel slots connected by curves.

Another object is to permit the above objects to be attained with a motor drive, when desired.

These and other objects will be apparent. The invention will be described in connection with the tuning control and indicating mechanism of a very broad band, high frequency radio receiver in which a variable inductance tuning unit is used.

The invention may be understood from the following description and the drawings in which:

Fig. 1 is a section along 1—1 of Fig. 2.

Fig. 2 is a plan view of an embodiment of the invention.

Fig. 3 is a plan view with the dial face and backing plate removed.

Fig. 4 is a section along 4—4 of Fig. 2 on an enlarged scale.

Fig. 5 is a perspective view of the portion of a chain where the pointer is attached.

Fig. 6 is a plan view of the dial face and pointer of another embodiment of the invention, and Fig. 7 is a section along the line 7—7 of Fig. 6 on an enlarged scale.

In the drawings reference character 1 indicates a dial face that is provided with a slot 2. A scale 3 is inscribed along the slot 2 and a pointer 4 is caused to move along the slot 2. This pointer 4 is attached to a chain 5 at the sheet metal link 6. This chain 5 is supported by the sprocket 7 and the idler 8 and travels in the spaces between the guides 9 which are supported on the frame 10.

The sprocket 7 is carried on and driven by a shaft 11 which has a spherically shaped portion 11' which is supported in a bearing 12 that is carried by a slidable bracket 13 which is pressed by a compression spring 14 one end of which bears against the case 15 to keep the chain 5 taut. The bracket 13 is provided with a slot 13' in which a screw 13" permits and limits movement of bracket 13 along the screw 13".

In the single slot device of Figs. 1 to 5 the various calibrations are laid out along both sides and around one end of the slot 2 as the scale 3 on the dial face 1 shown in Fig. 2. The pointer 4 will indicate on the scale 3 any rotation of shaft 11 which may be suitably connected to any tuning device.

The sprocket and chain arrangement permits this to be done without danger of slipping. The initial slack and any that may be introduced into the system through use or wear is taken up automatically by the outward thrust of the spring 14 one end of which bears against a wall of the case 15 and the other against the slidable bracket 13 that carries the shaft 11 in the bearing 12.

The pointer 4 is so attached to the chain 5 that at the pulley end it turns about on itself and traverses the opposite side of the slot 2. This permits twice the length of scale to be provided in a given dial space as compared to the type of slide rule dial that traverses only one side of its scale.

In the modification shown in Figs. 6 and 7 reference character 16 indicates a dial face in which a slot 17 is provided that has curved portions and straight portions. A scale 18 consisting of numerals is placed alongside the slot 17 and a pointer 19 is caused to move along this slot. This pointer 19 is attached to a chain 20 which is driven by the sprocket 21a. This chain passes around idlers 22—22c which are all supported by the frame 23. A spring pressed idler 22' is provided to keep the chain 20 taut.

The sprocket 21a (Fig. 7) is carried by the sprocket shaft 11' which is mounted in the elongated bearing 21b. It is driven from the shaft 29 of motor 30 by a gear train 24, 25, 26 and 27 through a slip clutch 28, which comprises compression spring 28'.

The purpose of the slip clutch 28 is to prevent damage when the tuner reaches the end of its travel while power is still being applied to its shaft. This shaft 29 is adapted to be connected to the manual tuning control shaft 31 by means of a magnetic clutch 32.

With this invention very long scales can be utilized in a comparatively small space particularly as shown in Fig. 6. In this embodiment the pointer 19 travels across from left to right, around an idler 22, back from right to left, then around another idler 22a, back from left to right around idler 22b and back from right to left to idler 22c.

In the modification shown in Figs. 6 and 7 the slide rule dial operates as described above, but the approximate setting is made by motor and the final fine adjustment is made by hand. The hand adjustment is accomplished by opening a switch (not shown) in the circuit that supplies current to the magnetic clutch 32, thus shutting off the supply of current to the magnet and so disengaging motor shaft 29 from the manual tuning knob shaft 31. This prevents the knob on shaft 31 from turning at the speed of the motor with possible injury to the operator. The opening of this switch moves it into position to close a circuit through a snap switch not shown, to the motor 30 so that this motor rotates, driving the sprocket 21a through the gear train 27, 26, 25, 24, slip clutch 28 and shaft 11. The switch is released by the operator when the pointer 19 has nearly reached the desired point on the scale. The motor contacts then open and the clutch contacts close engaging the clutch 32 and permitting the operator to use the manual tuning knob to operate the tuner and dial pointer by means of the shaft 31, magnetic clutch 32, motor shaft 29, gear train 27, 26, 25 and 24, slip clutch 28 and the shaft 11 affording vernier tuning through this gear train. The bearing 21b of Fig. 7 for shaft 11' is fixed. Chain tension is provided by ballcrank 33, pulley 22' and spring 34, as shown in Fig. 6.

The switch mentioned above may be arranged so that when the knob is turned to the left, the pointer travels counter-clockwise and when it is turned to the right, the pointer travels clockwise.

What is claimed is:

1. In an indicating device, a dial face having a slot therein, a scale alongside said slot, a pointer, and means comprising a motor and a magnetic slip clutch to move said pointer along said slot selectively in either of two directions to indicate one series of indicia while moving longitudinally in one direction and a different series of indicia while moving longitudinally in the opposite direction.

2. An indicating device comprising a plate having a slot therein, a shaft extending toward said plate, a sprocket on the extending portion of said shaft, an idler behind said plate, a chain connecting said sprocket and idler, and a pointer carried by said chain and extending through said slot and having its end portion parallel to said plate whereby said shaft, idler and chain cause said pointer to traverse said slot on one side and then turn 180° and traverse the opposite side of said slot.

3. An indicating device comprising a dial face having a slot therein, a scale on said dial face extending longitudinally adjacent said slot, a flexible power transmitting cable extending along said slot between the ends thereof around a guide positioned at one end of said slot and extending back toward the other end thereof, and a pointer attached to said cable and movable therewith to indicate sequentially and selectively all parts of said scale, said pointer making a 180° turn to reverse direction at the end of said slot.

HERBERT BERNARD.

REFERENCES CITED

The following references are of record in the file of this patent:

UNITED STATES PATENTS

| Number | Name | Date |
|---|---|---|
| 1,041,059 | Fox | Oct. 15, 1912 |
| 1,391,279 | Seignol | Sept. 20, 1921 |
| 1,654,943 | Nott | Jan. 3, 1928 |
| 1,695,919 | Gould | Dec. 18, 1928 |
| 1,734,553 | Bartlett | Nov. 5, 1929 |
| 1,769,439 | Lee | July 1, 1930 |
| 1,776,842 | Reinicke | Sept. 30, 1930 |
| 1,809,509 | Crossley et al. | June 9, 1931 |
| 1,827,959 | Stahelin | Oct. 20, 1931 |
| 2,081,752 | Linsell | May 25, 1937 |
| 2,185,482 | Wallace | Jan. 2, 1940 |
| 2,217,609 | Bierman | Oct. 8, 1940 |
| 2,295,387 | Creager | Sept. 8, 1942 |

FOREIGN PATENTS

| Number | Country | Date |
|---|---|---|
| 350,654 | Germany | Mar. 23, 1922 |
| 496,837 | Great Britain | Dec. 7, 1938 |
| 760,500 | France | Feb. 23, 1934 |